Oct. 29, 1968
R. M. CHAPMAN ET AL  3,408,563
MAGNETIC-FIELD-RESPONSIVE PROXIMITY DETECTOR APPARATUS
UTILIZING A HALL-EFFECT DEVICE
Filed Feb. 12, 1965
3 Sheets-Sheet 1
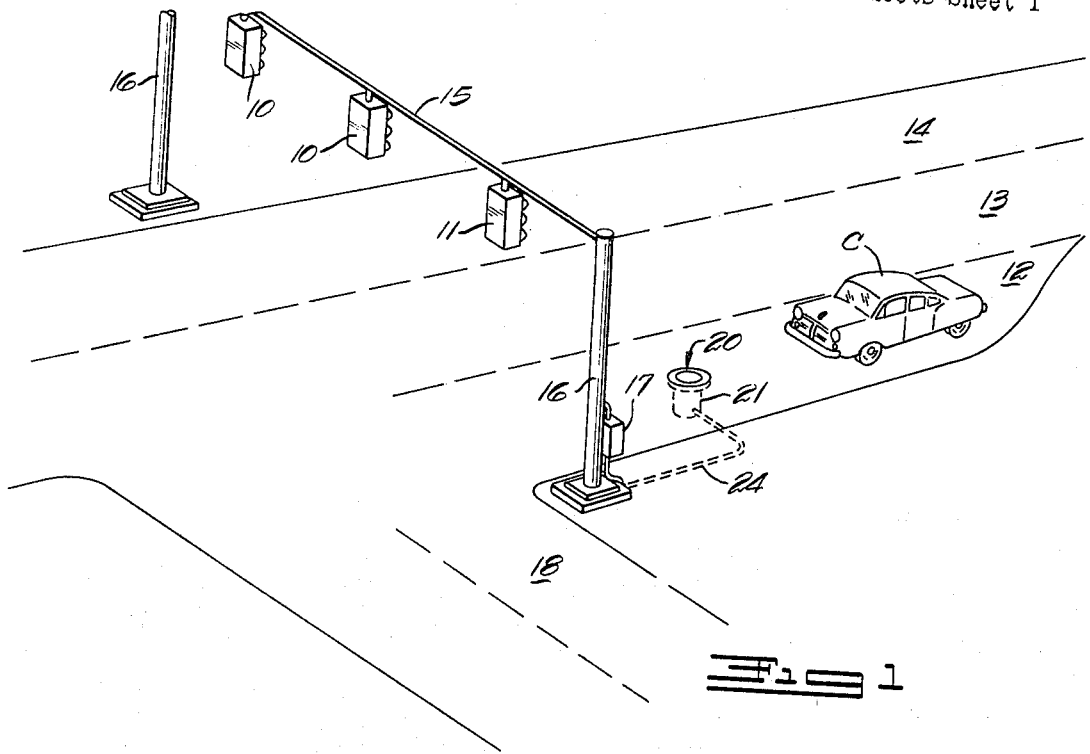
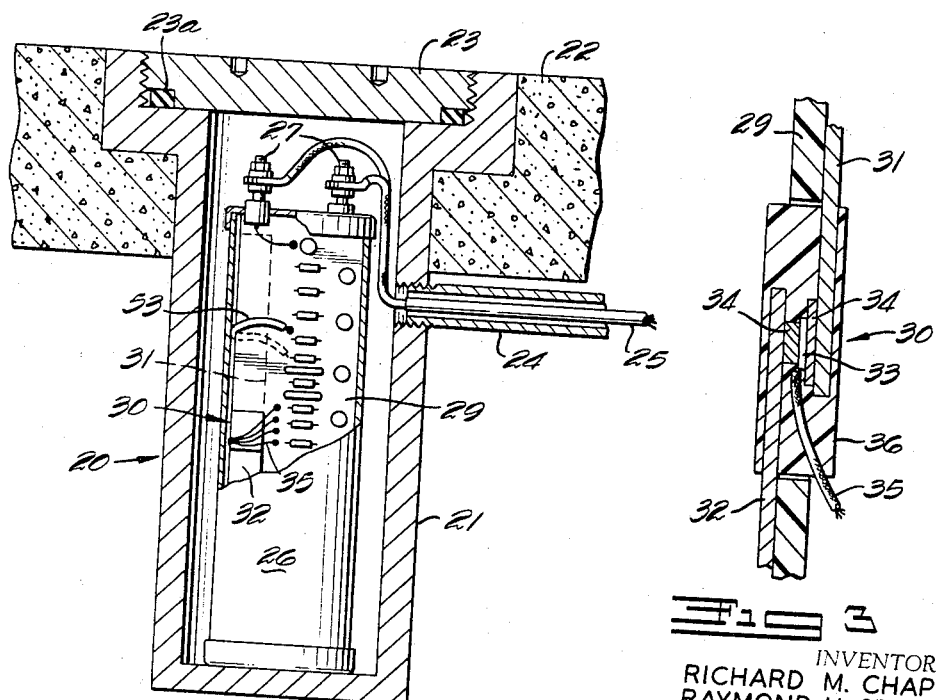
INVENTORS.
RICHARD M. CHAPMAN
RAYMOND H. STEVENS
BY MAHONEY, MILLER & RAMBO
BY Wm. V. Miller
ATTORNEYS

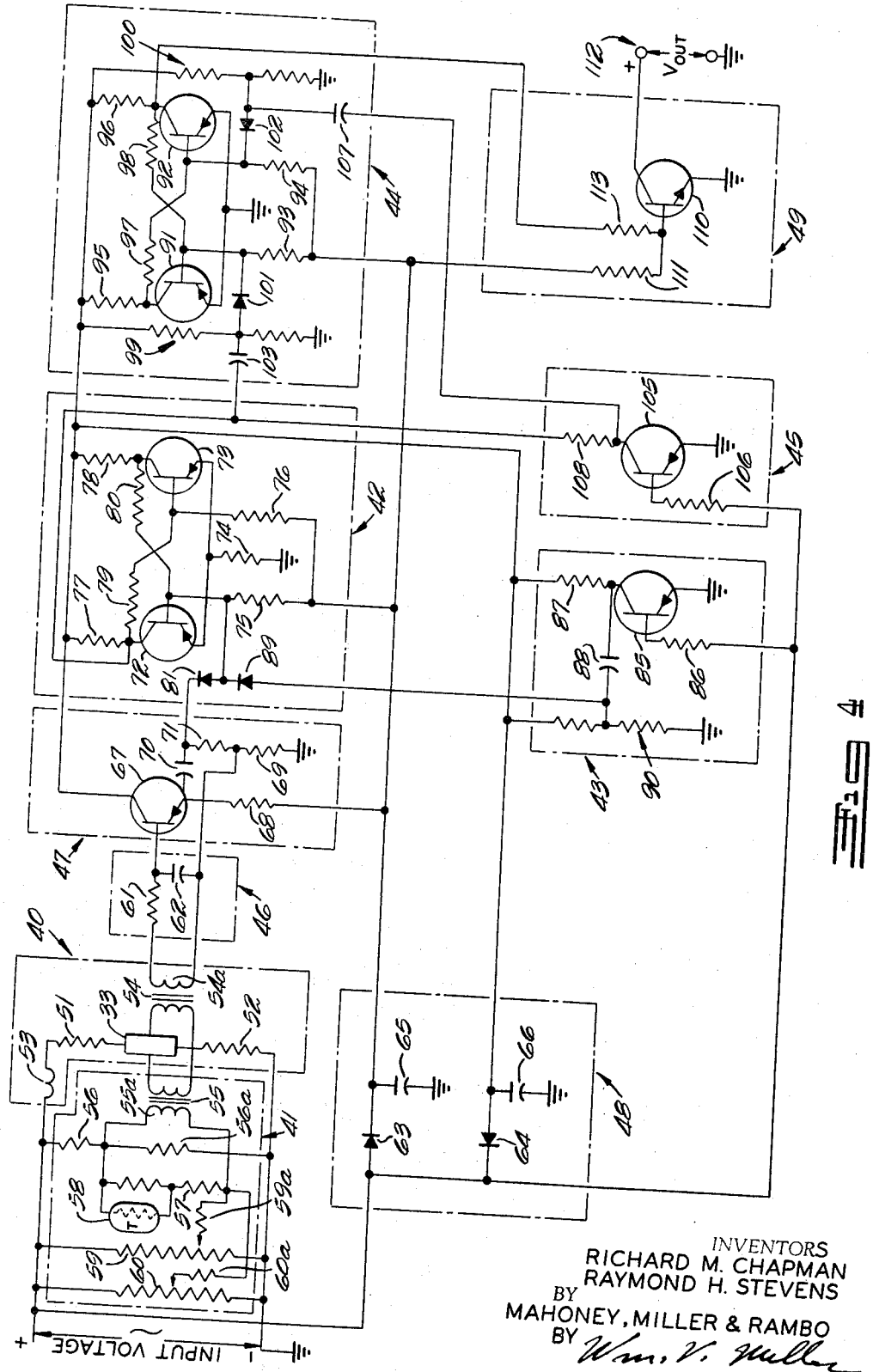

United States Patent Office 3,408,563
Patented Oct. 29, 1968

3,408,563
MAGNETIC-FIELD-RESPONSIVE PROXIMITY DETECTOR APPARATUS UTILIZING A HALL-EFFECT DEVICE
Richard M. Chapman and Raymond H. Stevens, Columbus, Ohio, assignors to F. W. Bell, Inc., Columbus, Ohio, a corporation of Ohio
Filed Feb. 12, 1965, Ser. No. 432,326
5 Claims. (Cl. 324—45)

ABSTRACT OF THE DISCLOSURE

Disturbance of a static magnetic field is detected by a magnetic-field-sensing device incorporating a Hall-effect element and residual magnetic field canceling circuitry and which forms an alternating current waveform signal related to the field disturbance. This signal is then detected by an amplitude sensitive circuit that operates to form an output signal when the field disturbance reaches a predetermined level and will maintain the output signal for the duration of the disturbance with removal of the output signal occurring within one cycle of the input signal after the disturbance has diminished to a value less than the predetermined level.

---

The apparatus of this invention has specific application in vehicular traffic control and a detector apparatus embodying the invention is illustrated and described herein in a typical installation for such an application. Other applications of the apparatus will be readily apparent and the specifically described installation is not to be considered as a limitation on the scope of the invention. With respect to the traffic control application, the detection of vehicles in specific traffic lanes is essential to provide the necessary control information for operation of traffic signals in expeditiously controlling the traffic. It is particularly important that the vehicles which enter a turn-lane be detected to permit selective actuation of a respective turn indicator of the traffic signal. An equally important instance of traffic control is in the issuance of a parking receipt for each vehicle which enters a parking facility. Each parking facility must either be provided with an attendant at the entrance or an automatic mechanism incorporating a vehicle detector apparatus for the issuance of the parking receipt.

Prior art vehicle detector apparatus heretofore utilized in applications of this type or similar applications have included the treadle-switch and radio-frequency or ultrasonic beam reflection systems. Of these types of systems, the treadle-switch has been the earliest utilized type and is currently utilized in a large number of installations. The treadle-switch systems comprise a mechanically-actuated switch mechanism which is embedded in the roadway over which the vehicles are to pass and will be actuated to signal a control circuit of the passage of a vehicle. While capable of being ruggedly constructed to withstand the repeated application of heavy loads, installation of the treadle-switch mechanism in the roadway is a relatively costly operation and there must be continued service maintenance for optimum operation.

The radio-frequency and ultrasonic beam reflection systems heretofore available for applications of this type are relatively expensive as to equipment cost although their installation does not require costly modification of the roadway. Either type requires relatively complex electronic circuitry to effect the necessary signal transmission and reception and the operational maintenance of such complex circuitry represents a cost factor of some importance.

Weather is a factor in attaining the satisfactory operation of any of the enumerated types of prior art apparatus. With respect to the treadle-switch type, accumulations of snow and ice on the roadway and exposed parts of the switch mechanism will interfere with the operation of the switch. The ultrasonic beam reflection type has a substantially reduced response where snow may accumulate on the reflective surfaces of the vehicle. Weather characteristics also affect the radio-frequency beam reflection type through interference with the radio-frequency radiation transmission. To summarize, the prior art detector apparatus are relatively costly to acquire and install and have not been found to be satisfactorily reliable in all environments.

It is, therefore, the primary object of this invention to provide a detector apparatus which is responsive to distortion of an environmental magnetic field by a body positioned in the proximity of a magnetic-field-sensing device of the apparatus and which is substantially unaffected by weather or other means of interference.

It is another important object of this invention to provide a highly sensitive detector apparatus having a magnetic-field-sensing device utilizing a Hall-effect device and which is responsive to distortion of the earth's magnetic field by a proximately disposed body.

It is a further object of this invention to provide a magnetic-field-responsive detector apparatus having an electronic switching circuit including a magnetic-field-sensing device which forms an input signal in response to distortion of a magnetic field and which provides an output signal only when the input signal amplitude is greater than a predetermined value.

Another object of this invention is to provide a magnetic-field-responsive detector apparatus having an electronic switching circuit which will rapidly respond to an alternating-current input signal from a magnetic-field-sensing device to provide an output signal within a time interval of one cycle of the input signal.

It is also an object of this invention to provide a detector apparatus which may be economically manufactured, is highly sensitive to low intensity magnetic fields and includes a ruggedly constructed magnetic-field-sensing device which utilizes a Hall-effect device and a magnetic field concentrating means that may be easily installed in the roadway at a relatively low cost.

These and other objects and advantages of this invention will be readily apparent from the following detailed description of an embodiment thereof and the accompanying drawings.

In the drawings:

FIGURE 1 is a diagrammatic illustration of a proximity detector system incorporated in a traffic control application utilizing a magnetic-field detector apparatus embodying this invention.

FIGURE 2 is an enlarged, sectional view of the magnetic-field-sensing device for the apparatus and which is embedded in the roadway.

FIGURE 3 is a fragmentary, enlarged sectional view of the magnetic-field-sensing device showing the Hall-effect device and magnetic-field concentrating means.

FIGURE 4 is a schematic diagram of the electronic circuit of the apparatus.

Figure 5:
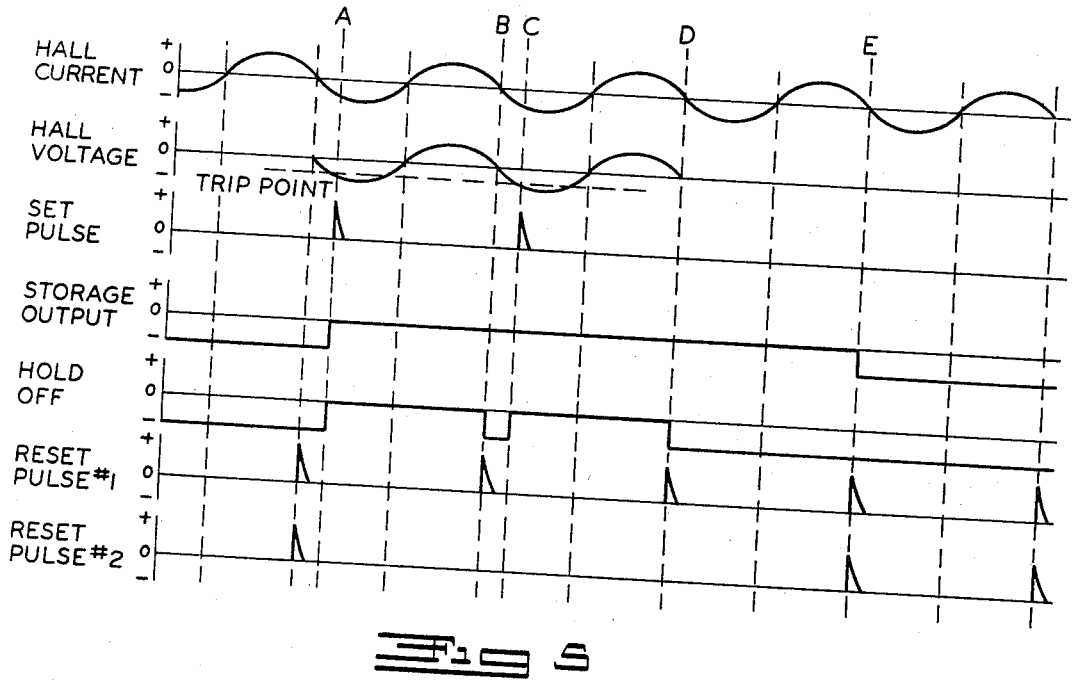
FIGURE 5 is a graphic representation of the detector apparatus operation showing the current and voltage waveforms at several of the circuit elements.

Having reference to the drawings, a detector apparatus embodying this invention is diagrammatically shown in FIGURE 1 as incorporated in a motor vehicle control installation. This installation, for illustration of a typical control function, includes two selectively operable, three-light signals 10 which are suspended above their respective through lanes 13 and 14 of a multiple lane roadway. An additional lane 12 is provided for vehicles desiring to turn left and is provided with its own selectively operable signal light 11. The signals 10 and 11 are conventionally suspended above the roadway by a cable 15 suppored on a pair of upright standards 16 which are positioned on opposite sides of the roadway (with the cable connection to the upper standard not illustrated). Each signal is for selectively controlling the movement of the motor vehicles in the respective lanes and is operated through a control system of well known construction mounted in a control box 17 which is mounted on one of the standards 16. In this installation, lane 12 is designated as a left turn lane for an intersecting cross street 18. A second roadway, not shown, would normally be placed closely adjacent to the illustrated roadway for carrying vehicular traffic in the opposite direction with the traffic on the cross street 18 being cooperatively regulated by similar signal lights and control system. In the typical installation, the two-control systems are interconnected for proper synchronization.

In the preferred pattern of control, left-turning traffic in lane 12 is held while through traffic in lanes 13 and 14 is premitted to proceed through the intersection. After the through traffic has been permitted to move through the intersection on lanes 13 and 14 for a predetermined time interval, the through signals 10 will be operated to stop the traffic in lanes 13 and 14 and the turn signal 11 will be operated to permit the left-turning traffic in lane 12 to proceed into the cross street 18. The signal would again be operated at the conclusion of a left turn interval for lane 12 to permit entry of vehicles to lanes 13 and 14 from the cross street 18. This would complete a control cycle and a successive control cycle would be initiated.

To expedite traffic flow, it is necessary to incorporate detector means in the signal control system which would be responsive to the persence of vehicles in the turn lane 12. The detector means determines the presence of a vehicle in the turn lane and actuates the control system for inclusion of a left turn signal in usual sequence as described hereinbefore. At any time in the usual sequence for the left turn signal that the detector means does not sense the presence of a vehicle in the turn lane 12, the control system operates to omit the left turn signal and thereby eliminate lost time in the control sequence.

The detector apparatus 20 of this invention comprises a sensing unit and an electronic circuit designed to provide a suitable signal voltage to the controller system of conventional construction contained within the control box 17. Such a controller system includes a timer mechanism and solenoid-actuated contactors for selective operation of the signal lights. The timer mechanism may be of the type which will automatically omit the left turn portion of the timing sequence unless a signal voltage is received. The signal voltage will only be provided when a motor vehicle C is in close proximity to the sensing unit 20 as when the vehicle is positioned immediately over the unit and there will not be a signal voltage in response to vehicles traveling along the adjacently disposed through lane 13. Thus, the presence of a vehicle in the turn lane 12 will be detected and a signal transmitted to the controller system which will accordingly include the left turn in the signaling sequence. Absence of a vehicle in close proximity to the detector apparatus 20 will result in a zero signal transmission and the control system will operate to omit the left turn signal with consequent expediting of the traffic flow.

In accordance with this invention, the sensing unit of the detector apparatus 20 is responsive to magnetic fields and is advantageously constructed utilizing a Hall-effect semiconductor device as the magnetic-field-responsive element. The Hall-effect semiconductor device is connected into an electronic circuit of this invention which eliminates the normal output signal due to the earth's static magnetic field and provides a signal only when the earth's magnetic field in proximity to the sensing unit has been distorted. A local distortion in the earth's magnetic field will result from the presence of a vehicle which is constructed from ferromagnetic material or which creates its own magnetic field as a consequence of the operation of electrical equipment. A distortion of the earth's magnetic field in proximity to the sensing unit will result in a change in the output Hall-voltage of the Hall-effect device with the output voltage change being related to the distortion in the magnetic field and effectively coupled with the Hall-effect device. By appropriate design of the electronic circuitry, the apparatus is only responsive to Hall-voltage changes of predetermined magnitude and will, therefore, only transmit a signal voltage to the traffic signal control system when a vehicle is within a given distance of the apparatus sensing unit. This eliminates the possibility of erroneous signals due to vehicles which are not within the prescribed distance of the sensing unit or other weak signals resulting from other types of interference.

The detector apparatus 20, exclusive of electrical power source and certain control elements, is positioned in the roadbed of the left-turn lane 12 at a point preceding the controlled intersection for detection of a vehicle C approaching the intersection. The specific location of the apparatus relative to the intersection is dependent on the time at which it is desired to ascertain the approach of the vehicles within the lane. As is best shown in FIGURE 2, the detector apparatus 20 includes a protective housing 21 of elongated tubular form which is adapted to be embedded in the concrete roadway surface structure 22 in an upright position. The housing 21 is fabricated from aluminum in the present embodiment; however, other suitable nonmagnetic materials may also be utilized. Removably mounted in the upper, open end of the housing 21 is a screw threaded closure plate 23 that forms a smooth continuation of the roadway surface. The closure plate 23 preferably forms a weathertight seal with the housing 21 by means of a sealing gasket 23a for protection and stabilization of the Hall-effect device and its associated structure. Threaded into the side wall of the housing 21 is a rigid electrical conduit 24 which extends beneath the roadway surface structure 22 and connects with the control box 17. Carried within the conduit 24 is a four-conductor cable 25 for electrically connecting the control box 17 with the Hall-effect device and electronic circuit and which is also sealed in the conduit 24 to prevent entrance of moisture to the housing 21 through the conduit.

Disposed within the housing 21 is a structurally rigid capsule 26 containing the Hall-effect device and electronic circuit. The capsule 26 is also of elongated tubular form and is generally coaxially positioned within the housing 21 and is supported with one end resting on the lower end wall of the housing 21. Four electrical terminals 27 project through the upper end wall of the capsule 26 for connection with the respective conductors of the cable 25. The capsule 26 is preferably of hermetically sealed construction for protection and stability of the electronic components and is fabricated from a brass or other suitable non-magnetic material.

Rigidly fixed within the capsule 26 is an electronic circuitry mounting board 29, which may be of the printed circuit type, on which are mounted the several electronic components including the Hall-effect device generally identified by the numeral 30. The specific structure of the Hall-effect device 30, which is illustrated in greater detail in FIGURE 3, comprises a pair of elongated, ferromagnetic bars, 31 and 32, and a Hall-effect semiconductor piece 33. Each bar, 31 and 32, is fabricated from a ferromagnetic material having a high relative permeability and, as in the present embodiment, may be approximately four inches long, one-half inch wide and less than one-tenth inch thick. The bars are disposed in parallel relationship with adjacent marginal end portions overlapped and spaced apart approximately one-tenth inch. Interposed between the opposed surfaces of the bars, 31 and 32, is the Hall-effect semiconductor piece 33 which is of flat rectangular form. Any of several well known semiconductor materials may be utilized in the fabrication of the Hall-effect piece 33 and to provide a low reluctance magnetic path, a pair of ferrite plates 34 are positioned on either side of the Hall-effect piece and are suitably bonded to the Hall-effect piece and to the respective bar, 31 or 32. Connected to the Hall-effect piece 33 are four conductors, generally designated by the numeral 35, which connect with the electronic circuit for supplying the Hall current and picking up a resultant Hall voltage which forms the input signal to the electronic circuit. These conductors are attached to the Hall-effect piece in the usual arrangement of two pairs in quadrature with the conductors of each pair diametrically opposed. The marginal end portions of the bars, 31 and 32, the Hall-effect piece 33, and the protective ferrite plates 34 when thus assembled, are encapsulated in a suitable molding compound 36, which may be of the epoxy resin type, thereby forming a structurally rigid assembly.

The assembled Hall-effect device 30 is rigidly fixed in the capsule 26 by connection to the electronic circuit board 29 which is potted in the capsule 26. The thickness of the circuit board 29 is approximately equal to the offset or lateral spacing of the bars 31 and 32 and the Hall-effect semiconductor piece 33 may be positioned in a notch formed in the board along one marginal edge with the bars being cemented to opposite sides of the board. As best seen in FIGURE 2, the bars 31 and 32 of the device will thus extend in a generally vertical direction and will be disposed in a skew relationship to the flux lines of the earth's magnetic field. This specific arrangement is of particular advantage in that there will be a concentration of the magnetic flux lines between the overlapped marginal end portions of the bars. This concentration of the magnetic flux lines provides a relative increase in the effect of the earth's magnetic field on the Hall-effect piece with a consequent increase in the Hall output voltage for any given Hall driving current. Local distortions in the earth's magnetic field will thus have a greater effect on the output with resultant greater sensitivity.

Referring to FIGURE 4, the electronic circuit is seen to include the basic interconnected units of a sensing unit 40, balance signal input 41, level sensing circuit 42, first reset pulser 43, storage circuit 44 and second reset pulser 45. Also incorporated in the illustrated circuit and interconnected with the basic units is an electronic filter network 46, an input signal amplifier 47, a power supply 48 and an output-signal power amplifier 49. The several units in the present embodiment are designed for the utilization of semiconductor devices which reduce the space requirements of the circuit and reduce the electrical power requirements although the circuit could be designed with conventional vacuum-type electron devices. A power source of alternating-current waveform, usually sinusoidal, is required for the operation of the apparatus and is generally indicated as connected to the circuit. Such a power source suitable for the present application may be the readily available A.C. distribution network with the necessary voltage transformation for the specific circuit design. This particular type of power source has a given frequency of 60 cycles per second but the specific frequency is not to be considered a limitation on the scope of the invention.

The sensing unit 40 comprises the Hall-effect piece 33, previously described, having the input driving current terminals thereof connectable to the power source through the series connected resistors 51 and 52. An induction coil 53 comprising a single turn is looped around one of the bars 31 of the sensing element and is connected in series with the driving current conductor to provide a cancellation of the second harmonic output of the Hall-effect element. The usual placement of driving current conductors for connection with the Hall-effect piece produces a magnetic field in proximity thereto which results in an error signal and the induction coil 53 is connected to provide an opposing signal that effectively cancels this error signal. The Hall-voltage output terminals of the Hall-effect piece 33 are connected in circuit with the series connected primary winding of an output coupling transformer 54 and the secondary winding of a balance-signal coupling transformer 55.

Operation of the apparatus is dependent on the detection of a change in the effective magnetic field to which the Hall-effect piece 33 is subjected. It is the function of the balance signal input 41 to inject a suitable signal in the Hall-voltage output circuit of the sensing unit 40 to effectively cancel that component of the Hall-voltage which is due to the earth's magnetic field as normally present and undistorted. Consequently, voltage input to transformer 54 will be provided only when the earth's magnetic field has been distorted to an extent that the effective magnetic field is either greater or less than the normal or residual magnetic field. To accomplish this objective, the injected balance signal must be of the same frequency and amplitude as the residual output of the Hall-effect element but have a relative phase displacement of 180 degrees. One terminal of the coupling transformer primary winding 55a is connected to a voltage divider comprising a pair of series resistors 56 and 56a which are of equal value and are connected in series to the power source which also drives the Hall-effect element 33. The connection of the primary winding 55a will thus be at the electrical center to permit injection of either a relatively positive or negative signal as is required to cancel the effect of a residual magnetic field at a specific installation. Connected in shunt relationship across the primary winding 55a is a tapped resistor 57 which has a thermistor 58 connected across a tapped section to form a temperature compensation network. A pair of potentiometers 59 and 60 connected in parallel are also connected to the power source to provide the balance signal input. The sliders of each potentiometer, 59 and 60, are connected through respective resistors 59a and 60a to a common terminal of the primary winding 55a and the resistor 57 and, through appropriate selection of resistance values for the potentiometers and slider resistors, provide coarse and fine adjustment of the balance signal.

For convenience of adjustment of the balance signal at the time of installation or at any subsequent time when the residual signal may have changed, the potentiometers 59 and 60 are preferably mounted in the control box 17. Similarly, the power supply is located in the control box 17 and may comprise a step-down transformer (not shown) having a turns ratio so as to provide a suitable input voltage to the apparatus, such as six volts. A pair of conductors in the cable 25 connecting the control box 17 with the detector apparatus 20 are utilized for the power supply and a third conductor is utilized for the potentiometer sliders which have a common connection. One conductor of input voltage pair forms a common ground which is also utilized by the balance signal circuit 41 and the other components of the circuit.

At any time there is a distortion of the earth's magnetic field, there will be an effective Hall-voltage change produced in the output of the Hall-effect piece and this voltage will appear as an input signal to the circuit across the terminals of the secondary winding 54a of the output coupling transformer 54. This input signal will also have an alternating-current waveform of the given frequency and an amplitude which is related to the magnetic field distortion.

The earth's magnetic field is characteristically unidirectional in form and an alternating-current driving current for the Hall-effect piece 33 will provide an alternating-current voltage output of the same frequency. If necessary, for optimum operation of the apparatus in a specific installation, an electronic filter network 46 may be connected to the output coupling transformer 54 to eliminate interference signals. An electronic filter network of simplified form comprising a series resistor 61 and shunt connected capacitor 62 is shown in FIGURE 4 to eliminate high frequency interference signals. Other well known filter networks may be readily substituted for the illustrated network as may be required for specific installations.

Several of the units of the circuit require direct-current voltages for their operation. The power supply 48, comprising a pair of semiconductor diodes, 63 and 64, which are each connected to the same power source driving the sensing unit 40, provides a relatively positive and negative half-wave rectified voltage at the respective output terminal connections. A grounded capacitor, 65 and 66, connected to the output lead of each respective rectifier diode, 63 and 64, provides the necessary filtering for proper operation of the several circuit units.

The input signal provided by the sensing unit 40 will normally be of a relatively low amplitude. To increase the input signal amplitude to a usable magnitude, an amplifier 47 may be connected to the output of the filter network 46 as in the present circuit shown in FIGURE 4. This amplifier comprises a single stage of amplification utilizing a transistor 67 of the PNP type. The emitter of the transistor 67 is connected to the positive voltage section of the power supply 48 through the resistor 68 while the collector is connected to the negative voltage section. The output of the filter network 46 is fed to the base of the transistor 67 and the base is grounded through a resistor 69. A coupling capacitor 70, also connected to the emitter, is connected to the grounding resistor 69 through a feedback resistor 71. The junction of the coupling capacitor 70 and feedback resistor 71 forms the amplified input signal connection for the succeeding unit.

The succeeding unit, which is the level sensing circuit 42, comprises a bistable circuit having first and second operating states. The circuit is of well known construction utilizing a pair of PNP type transistors, 72 and 73, having the emitters thereof grounded through a common resistor 74. The base of each transistor, 72 and 73, is connected to the positive voltage section of the power supply 48 through its respective resistor, 75 and 76, while the collectors are connected to the negative voltage section of the power supply through their respective resistors, 77 and 78. Resistors 79 and 80 connect the collectors of the transistors 72 and 73 to the bases of transistors 73 and 72, respectively. An input signal connection at the base of transistor 72 connects with the amplified signal connection of the amplifier 47 through a diode 81.

In the first of the two operating states of the level sensing circuit 42, there will be negative voltage at the output connection which is the collector of transistor 72. This operation in the first state will continue until the amplitude of the amplified input signal at least reaches a predetermined value. At that time, the circuit will be triggered to the second of the two operating states and the voltage at the output connection will change to zero. The level sensing circuit will then remain in the second operating state and will not be responsive to the input signal until a second triggering pulse is received causing the circuit to return to the first of the two operating states.

A first reset pulser 43 provides the second triggering pulse for returning the level sensing circuit 41 from the second operating state to the first operating state. The reset pulser 43 comprises a PNP-type junction transistor 85 having the emitter grounded and the base connected to the alternating-current supply through a biasing resistor 86. The collector is connected to the negative section of the power supply through a voltage dropping resistor 87 and to the input signal connection of the level sensing circuit through a series connected capacitor 88 and blocking diode 89. The common junction of capacitor 88 and diode 89 is tapped into a voltage divider network 90 comprising a pair of series-connected resistors connected between the negative voltage section of the power supply 48 and ground. This pulser is designed to form a positive trigger pulse at the beginning of each negative-going-voltage portion of each cycle of the alternating current power supply. Since the input signal to the level sensing circuit 42 is in phase with the power supply, the reset trigger pulse for this circuit will also be synchronized and occur at the beginning of the input signal cycle.

The voltage change at the output of the level sensing circuit 42 resulting when an input signal of predetermined amplitude is received is utilized to control the operation of the storage circuit 44. This storage circuit also comprises a bistable circuit including a pair of PNP-type junction transistors 91 and 92 having common grounded emitters. The base of each transistor 91 and 92 is connected to the positive voltage section of the power supply 48 through the respective resistors 93 and 94 and the collectors are connected to the negative voltage section of the power supply through resistors 95 and 96, respectively. Interconnection of collector and the base of opposite transistors for the triggering operation is through the resistors 97 and 98. A pair of voltage divider, resistance networks, 99 and 100, are connected between ground and the negative voltage output of the power supply 48 with a diode 101 and 102 tapped into the respective divider and connected to the base of the respective transistor. A coupling capacitor 103 connects the tap of voltage divider 99 with the output terminal connection of the level sensing circuit 42. In the present embodiment, the storage circuit 44 will provide a negative-voltage output signal in the first of the two operating states. When the output voltage of the level sensing circuit 42 changes to zero, a positive going voltage pulse or set pulse is produced at the input of the storage circuit and triggers this circuit to the second of the two operating states with the result that its output signal will change to zero. Thereafter, the circuit will continue operating in the second state until a reset pulse is received. The output terminal of the storage circuit 44 is the collector of transistor 92.

Resetting of the storage circuit 44 is accomplished by the second reset pulser 45. This reset pulser also comprises a PNP-type junction transistor 105 which has a grounded emitter connection and in which the base is connected to the alternating-current power supply through a biasing resistor 106 for synchronization of its operation. A coupling capacitor 107 connects the collector of transistor 105 to the tap of voltage divider 100 in the storage circuit 44 for injection of the reset pulse. Control of the second reset pulser 45 is effected by the level sensing circuit 42 through connection of the output connection thereof to the collector of transistor 105 through a resistor 108. When the level sensing circuit 42 is in the first of its two operating states, there will be a negative voltage at its output which will cause the second reset pulser 45 to form a positive-going voltage pulse at the beginning of each negative half-cycle of the power source voltage or Hall-current. This reset pulse applied to the storage circuit 44 will switch the storage circuit from its second operating state to the first. If the level sensing circuit 42 has been triggered to the second of its operating states, its output voltage is zero which prevents the second reset pulser 45 from forming a reset pulse. The output voltage of the level sensing circuit 42 remains at zero until the next succeeding negative-going, half-cycle of the power source voltage and thereby forms a hold-off signal until such time as the level sensing circuit output signal will have been negative for at least the immediately preceding portion of the cycle of the power source voltage.

The output-signal power amplifier 49 comprises a single stage of amplification utilizing an NPN-type junction transistor 110 which is operated with a grounded emitter. The base of the transistor 110 is connected to the positive voltage section of the power supply 48 through a resistor 111 and the collector forms an output terminal connection 112 along with a ground terminal, and provides a direct current output. The output terminal of the storage circuit 44 is connected to the base of transistor 110 through a resistor 113 and the direct current output of the storage circuit forms the input signal to the amplifier. In the present circuit, the amplifier 49 operates to provide a positive voltage at the output terminal 112 when the storage circuit output changes from negative to zero voltage with a single stage of amplification but it will be apparent that other types of amplification apparatus may be utilized to provide a specific output for a particular installation.

The operation of the detector apparatus can be more clearly understood by example with reference to the graphic diagrams of FIGURE 5. In this figure, the Hall-current or driving current supplied to the Hall-effect piece 33 by the power supply is shown in the uppermost curve. This current is of sinusoidal form and provides a time reference for the operation of the remaining elements of the electronic circuit. With the balance signal input 41 properly adjusted for a particular installation, there will not be a resultant Hall-voltage input signal produced at the secondary winding of the sensing unit coupling transformer 54 for an undistorted magnetic field. However, at any time a vehicle approaches the sensing unit 40, the earth's magnetic field will be distorted and a resultant Hall-voltage change will be produced. The amplitude of this Hall-voltage, which is synchronized with the Hall current and is assumed to be in phase therewith, is dependent on the proximity of the vehicle and is shown as received by the level sensing circuit 42. For purposes of illustration, the Hall-voltage change is assumed to have a duration of two cycles.

As previously described, the level sensing circuit 42 is designed to be nonresponsive unless an input signal of predetermined amplitude is received. This response point or trigger point is relatively indicated in the diagram of the Hall-voltage by the broken line which is displaced a distance below the O reference line. In this example, the amplitude of the Hall-voltage has a peak value which substantially exceeds the required trigger point and the waveform of the first cycle is seen to cross the trigger voltage at point A some time after he initiation of the cycle. At this time, the level sensing circuit 42 is triggered to its second operating state and a set-pulse is produced at the input of the storage circuit 44. The set-pulse in turn triggers the storage circuit 44 to its second operating state and a zero voltage output is produced as shown in the diagram designated as "Storage Output." Concurrently with the triggering of the storage circuit 44, a signal designated as "Hold-Off" will be transmitted to the second reset pulser 45 which will prevent its operation at the conclusion of the cycle, indicated at B, referenced to the power source voltage or Hall-current. In respect to the reset pulsers 43 and 45, it will be noted that both pulsers had operated at the beginning of this cycle to send a voltage pulse to their respective bistable circuit for triggering to the first operating state. At the conclusion of the first cycle, only the first reset pulser 43 will operate to trigger the level sensing circuit 42 to its first operating state.

A second cycle of the Hall voltage change is shown continuing from the first cycle on the assumption that the vehicle has remained within the range of the sensing unit 40. The level sensing circuit 42 will again be triggered, at point C, to produce a set-pulse but this second set-pulse will not have any effect on the storage circuit 44 which has continued to operate in the second of its two operating states to provide a storage output. A hold-off signal will again be transmitted to the second reset pulser 45 and prevent its operation at the conclusion of the second cycle at point D. Reset pulser 43 operates at the conclusion of the second cycle to return the level sensing circuit 42 to the first operating state.

At the beginning of the third cycle, point D, it is assumed that the vehicle has left the immediate vicinity of the sensing unit 40 and the Hall-voltage change has been reduced to zero. Consequently, the level sensing circuit 42 will not produce a set-pulse and no hold-off signal will be transmitted to the second reset pulser 45. The storage circuit 44 will continue to provide a storage output during the third cycle since it had not received a reset trigger pulse. Point E, which indicates the conclusion of the third cycle, shows the termination of the storage-output since both reset pulsers 43 and 45 will now be operated to trigger their respective bistable circuits to their first operating states.

Figure 6:
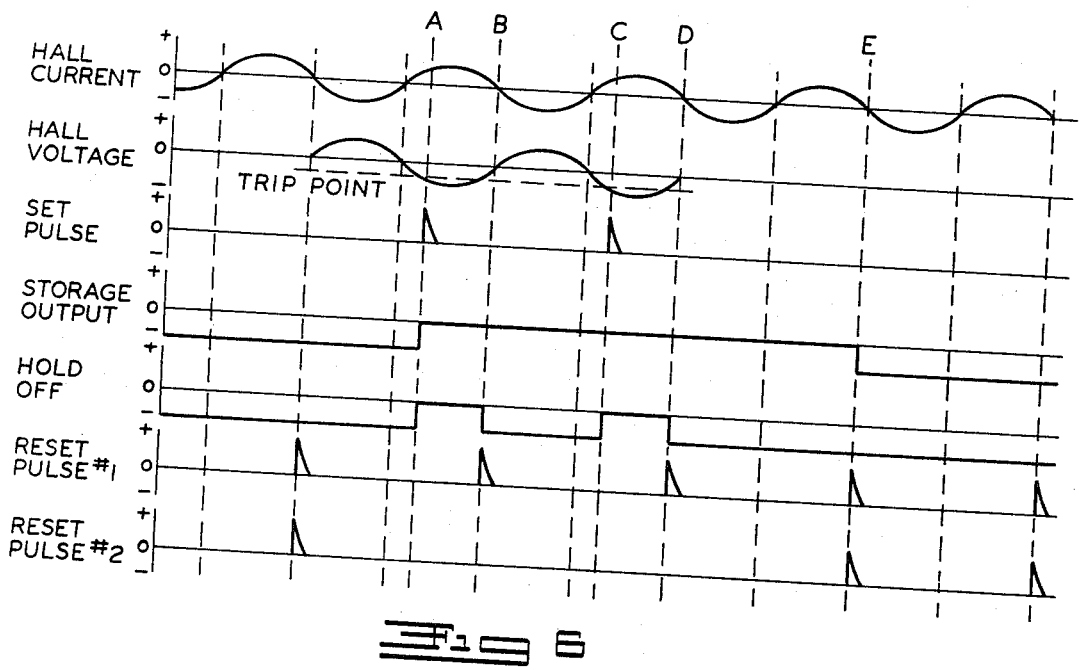
FIGURE 6 is a graphic representation of the current and voltage waveforms similar to FIGURE 5 but with a reversed magnetic field.

The preceding example has been based on a predetermined magnetic field orientation as sensed by the Hall-effect piece 33. An opposite magnetic field orientation example is shown in FIGURE 6 in which it will be noted that the Hall-voltage is displaced 180°. However, the operation of the circuit remains the same except for a relative displacement of the time of operation.

The storage output is utilized to operate a relay or other apparatus in the control system of the traffic control to include the turn signal as has been previously described. The detector apparatus is seen to be very fast acting as an actuating signal will be transmitted to the control system within one cycle of the Hall-current from the time a Hall-voltage change is produced which has an effective amplitude that will trigger the level sensing circuit. The apparatus also has a fast turn-off since the storage-output will terminate within two cycles from the time that the Hall-voltage change is reduced in amplitude to a level below the trigger point. Operating response speed may be readily increased or decreased through adjustment of the frequency of the Hall driving current.

The illustrated embodiment of the detector apparatus is assembled as a single unit which may be protectively disposed in the hermetically sealed capsule 26 and positioned in the roadbed. As indicated, this unitary assembly excludes the potentiometer of the balancing circuit and the power source. The advantages of this embodiment are that line losses are minimized and that stray pickup is virtually eliminated. Alternatively, the detector apparatus may be assembled in two units with one unit comprising the Hall-effect element and associated assembly which is mounted in the capsule buried in the roadbed. The remainder of the electronic circuitry would be included in a second unit that may be conveniently mounted in the control box 17. The latter embodiment would have an advantage in convenience of maintenance; however, stray pickup would present a substantial disadvantage because of the low level signals produced by the Hall-effect element and the relatively long lines required.

It will be readily apparent that the novel detector apparatus of this invention is an improvement in the art of detection of bodies which are magnetic or which affect magnetic fields. The utilization of a Hall-effect semiconductor element in the sensing unit provides improved sensitivity with the sensitivity being further enhanced by the novel magnetic flux concentrating construction of the sensing unit. The electronic circuit provides fast response for rapid operation of an associated control system. Also, the apparatus does not require movement of the body for detection and will provide a continuous output signal for a stationary body positioned in proximity to the sensing unit.

According to the provisions of the patent statutes, the principles of this invention has been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. A magnetic-field-responsive proximity detector apparatus comprising
   (A) magnetic-field-sensing means coupled with a magnetic field subject to distortion and connected to a driving electrical power source of alternating current waveform, said sensing means producing an electrical output signal of alternating current waveform which is related in amplitude to the magnetic field sensed by said means,
   (B) an electrical balance circuit connected with said magnetic-field-sensing means output signal and forming a balancing electrical signal for eliminating that part of said electrical output signal from said sensing means due to the sensed magnetic field when undistorted, thereby producing a resultant electrical signal which is related only to the distortion of said magnetic field, and
   (C) amplitude-sensitive circuit means connected to said resultant signal from said magnetic-field-sensing means and said balance circuit and responding to said resultant signal to form an output signal, said circuit means including
       (1) a first bistable circuit having first and second operating states and responding to said resultant signal when in said first operating state to switch to said second operating state when said resultant signal exceeds a predetermined amplitude, said bistable circuit forming said output signal only in said second operating state, and being resettable from said second to said first operating state upon application of a reset trigger pulse to said circuit and
       (2) a reset circuit forming a reset trigger pulse and connected to said electrical power source and operating synchronously therewith to form said reset trigger pulse at the beginning of each cycle of the power source waveform, said reset circuit connected with said first bistable circuit to apply said reset trigger pulse to said bistable circuit for resetting thereof.

2. A magnetic-field-responsive proximity detector apparatus according to claim 1 which includes
   (D) a signal storage circuit including
       (1) a second bistable circuit having first and second operating states connected to said first bistable circuit and responding to the output signal thereof when said second bistable circuit is in said first operating state to switch to said second operating state, said second bistable circuit forming a respective output signal only when in said second operating state and being resettable from said second to said first operating state upon application of a reset trigger pulse to said second bistable circuit, and
       (2) a second reset circuit forming a reset trigger pulse and connected to said second bistable circuit for applying said reset trigger pulse to said second bistable circuit for resetting thereof to said first operating state, said second reset circuit connected to the electrical power source for synchronous operation therewith and connected with said first bistable circuit to respond to the output signal thereof to only form said reset trigger pulse at the beginning of each cycle of the power source waveform when said first bistable circuit is in its first operating state and not producing an output signal.

3. A magnetic-field-responsive proximity detector apparatus according to claim 1 wherein said magnetic-field-sensing means comprises a Hall-effect device disposed in magnetically coupled relationship to the magnetic field and connected to receive a driving current from said electrical power source thereby producing a voltage of alternating current waveform related in amplitude to the magnetic field sensed and which forms said electrical output signal from said sensing means.

4. A magnetic-field-responsive proximity detector apparatus according to claim 3 wherein said balancing electrical signal formed by said electrical balance circuit comprises a voltage of alternating current waveform of the same magnitude but of opposite polarity to the voltage of said electrical input signal due only to the sensed magnetic field when undistorted.

5. A magnetic-field-responsive proximity detector apparatus according to claim 3 wherein said magnetic-field-sensing means includes magnetic-field-concentrating means disposed in magnetic circuit relationship to said Hall-effect device.

References Cited

UNITED STATES PATENTS

| | | | |
|---|---|---|---|
| 3,195,043 | 7/1965 | Burig et al. | 324—45 |
| 3,197,880 | 8/1965 | Rice et al. | 324—45 |
| 3,267,368 | 8/1966 | Rock et al. | 324—45 |
| 3,346,842 | 10/1967 | Dixon | 324—45 |

FOREIGN PATENTS 1,190,762  10/1959  France.

RUDOLPH V. ROLINEC, *Primary Examiner.*

R. J. CORCORAN, *Assistant Examiner.*